(12) United States Patent
Golasky et al.

(10) Patent No.: US 7,890,780 B2
(45) Date of Patent: Feb. 15, 2011

(54) SYSTEMS AND METHODS FOR MANAGING POWER FOR DATA STORAGE DEVICES

(75) Inventors: Richard Golasky, Round Rock, TX (US); Kevin Marks, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 565 days.

(21) Appl. No.: 12/032,408

(22) Filed: Feb. 15, 2008

(65) Prior Publication Data

US 2009/0207520 A1 Aug. 20, 2009

(51) Int. Cl.
*G06F 1/26* (2006.01)
(52) U.S. Cl. .............. 713/300; 713/310; 713/320; 713/321; 713/322; 713/324; 713/330; 713/340; 711/113; 711/117; 711/118
(58) Field of Classification Search .......... 713/300, 713/310, 320–324, 330, 340; 711/113, 117, 711/118
See application file for complete search history.

(56) References Cited

U.S. PATENT DOCUMENTS

| 5,682,515 | A | * | 10/1997 | Lau et al. ............... 711/118 |
| 5,913,223 | A | * | 6/1999 | Sheppard et al. ........... 711/118 |
| 5,937,433 | A | * | 8/1999 | Lee et al. ................ 711/158 |
| 6,370,614 | B1 | * | 4/2002 | Teoman et al. ............ 711/113 |
| 6,463,509 | B1 | * | 10/2002 | Teoman et al. ............ 711/137 |
| 6,618,791 | B1 | | 9/2003 | Dodd et al. ............. 711/105 |
| 7,218,566 | B1 | | 5/2007 | Totolos, Jr. et al. ........ 365/222 |
| 2005/0066207 | A1 | * | 3/2005 | Fleck et al. .............. 713/320 |

OTHER PUBLICATIONS

IBM TotalStorage LTO Ultrium 2 Tape Drive, Models T400 and T400F: Setup, Operator, and Service Guide, 3 pages, Nov. 2002.
HP Ultrium Tape Technology: HP Ultrium Format Tape Drives Entry-Level Half-Height and High-Performance Full-Height, 2 pages, Nov. 2002.

* cited by examiner

*Primary Examiner*—Abdelmoniem Elamin
(74) *Attorney, Agent, or Firm*—Baker Botts L.L.P.

(57) ABSTRACT

An information handling system may include a processor, a tape drive coupled to the processor, and a cache control module. The cache control module may be configured to receive a request from the processor for the tape drive; determine whether the tape drive is powered off; determine whether the tape drive needs to be powered on to process the request; and respond to the request on behalf of the tape drive if it is determined that (a) the tape drive is powered off and (b) the tape drive does not need to be powered on to process the request.

20 Claims, 1 Drawing Sheet

SYSTEMS AND METHODS FOR MANAGING POWER FOR DATA STORAGE DEVICES

TECHNICAL FIELD

The present disclosure relates in general to power management, and more particularly to systems and methods for managing power for data storage devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include one or more peripheral devices. In general, a peripheral device may include an item of hardware that expands the information handling system's capability or function. Peripheral devices may include devices internal to the information handling system chassis or case, as well as devices external to the information handling system chassis or case. Peripheral devices may include, without limitation, storage devices (e.g., CD-ROM, CD-RW, CD-R, DVD-ROM, DVD-RW, DVD-R, USB storage device, tape drive, floppy disk, hard disk drive, and/or disk array controller), input devices (e.g., keyboard, pointing device, microphone, image scanner, webcam, and/or barcode reader), and/or output devices (e.g., printer, sound card, speakers, graphics card, monitor, and/or docking station).

Storage devices, such as tape drives, may be used to permanently or temporarily store data for use by an information handling system. For example, data on a hard drive of an information handling system may be archived on tape drives. The archived data may be accessed when there is a failure to the hard drive, so the data may be written by the information handling system to the tape drive at a regular interval to provide up-to-date backup data.

One common drawback of tape drives is the power consumption of a tape drive, even when the tape drive is not in use (e.g., idling or not being written to). Typically, components of the tape drive, including internal fans and other components, are electrically active during the idle state, which increases the power consumption of the system.

In a network configuration including more than one information handling system, one or more tape drives may be used to store data. Thus, power consumption concerns are further elevated in many network configurations.

SUMMARY

In accordance with the teachings of the present disclosure, disadvantages and problems associated with diagnosis and allocating storage resources may be substantially reduced or eliminated.

In one embodiment, An information handling system may include a processor, a tape drive coupled to the processor, and a cache control module. The cache control module may be configured to receive a request from the processor for the tape drive; determine whether the tape drive is powered off; determine whether the tape drive needs to be powered on to process the request; and respond to the request on behalf of the tape drive if it is determined that (a) the tape drive is powered off and (b) the tape drive does not need to be powered on to process the request.

In another embodiment, an apparatus includes a cache control module configured to receive a request from the processor for the tape drive; determine whether the tape drive is powered off; determine whether the tape drive needs to be powered on to process the request; and respond to the request on behalf of the tape drive if it is determined that (a) the tape drive is powered off and (b) the tape drive does not need to be powered on to process the request.

In another embodiment, a method includes receiving at a cache control module a request from a processor intended for a tape drive; determining whether the tape drive is powered off; determining, based at least on the request, whether the tape drive needs to be powered on to process the request; and responding to the request on behalf of the tape drive if it is determined that (a) the tape drive is powered off and (b) the tape drive does not need to be powered on to process the request.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
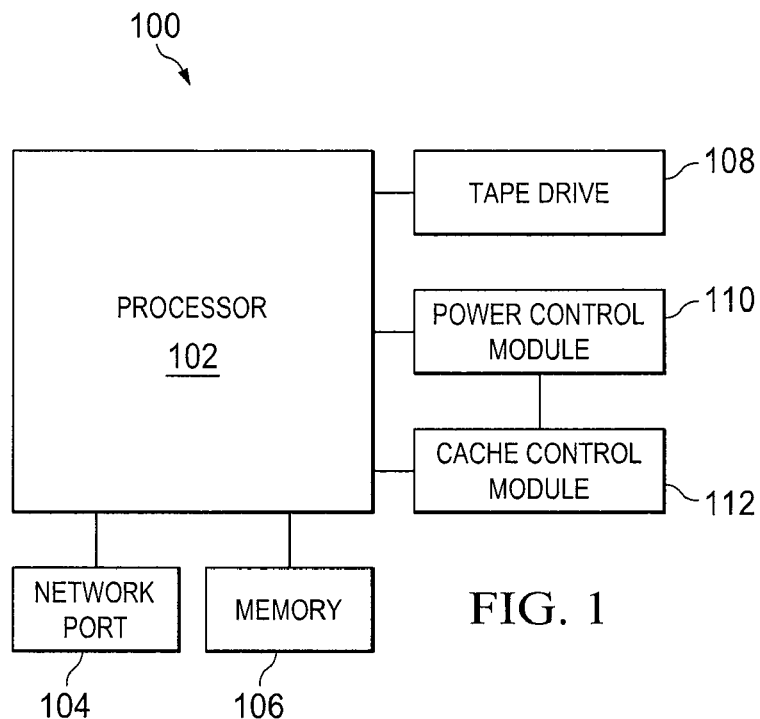
FIG. 1 illustrates an example information handling system including a tape drive, a power control module, and a cache control module for conserving power consumption, in accordance with embodiments of the present disclosure.
Figure 2:
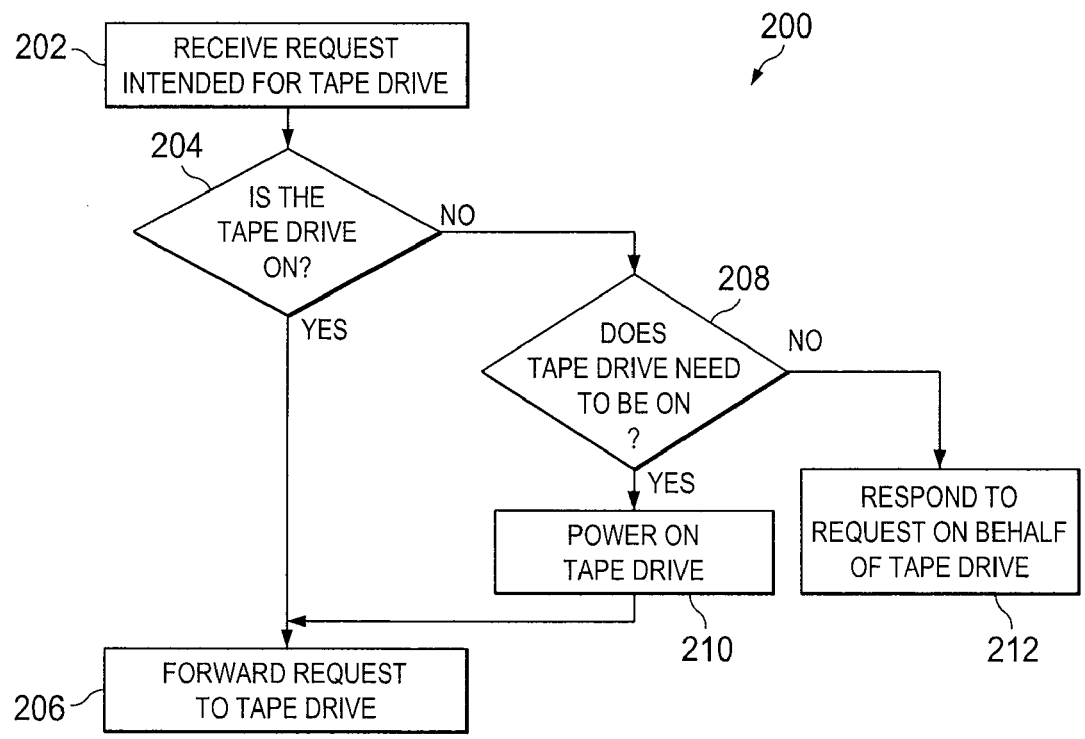
FIG. 2 illustrates a flowchart of a method for conserving power consumption associated with a tape drive, in accordance with embodiments of the present disclosure.

Preferred embodiments and their advantages are best understood by reference to FIGS. 1 and 2, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

FIG. 1 illustrates a block diagram of an example information handling system 100, in accordance with certain embodiments of the present disclosure. As shown in FIG. 1, information handling system 100 may include a processor 102, network port 104, memory 106, a tape drive 108, a power control module 110, and a cache control module 112.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 106 and/or another component of information handling system 100 and may output results, graphical user interfaces (GUIs), websites, and the like via a display and/or over network port 104.

Network port 104 may be any suitable system, apparatus, or device operable to serve as an interface between information handling system 100 and a network. Network port 104 may enable information handling system 100 to communicate over a network using any suitable transmission protocol and/or standard, including without limitation all transmission protocols and/or standards known in the art Memory 106 may be coupled to processor 102 and may comprise any system, device, or apparatus operable to retain program instructions or data for a period of time. Memory 106 may be random access memory (RAM), electrically erasable programmable read-only memory (EEPROM), a PCM-CIA card, flash memory, or any suitable selection and/or array of volatile or non-volatile memory that retains data after power to information handling system 100 is turned off.

Tape drive 108 may be coupled to processor 102 and may comprise any system, device, or apparatus operable to retain program instructions or data processed by processor 102 for a period of time (e.g., temporarily and/or permanently). In some embodiments, tape drive 108 may be a part of a network storage device or array having more than one tape drive 108 configured to store program instructions or data processed by more than one processor of a network (e.g., a local area network (LAN), a metropolitan area network (MAN), a storage area network (SAN), a wide area network (WAN), a wireless local area network (WLAN), a virtual private network (VPN), an intranet, the Internet or any other appropriate architecture or system that facilitates the communication of signals, data and/or messages) and transmitted over, for example, network port 104.

Power control module 110 coupled to processor 102 may be any system, device, or apparatus operable to provide power to tape drive 108. In some embodiments, power control module 110 may fully or partially power down tape drive 108 when tape drive 108 is idle, and power up tape drive 108 when tape drive 108 is needed for use.

In a network configuration (e.g., a multiple library configuration) in which more than one tape drive 108 is used, power control module 110 may control the power to each of tape drive 108 individually or in groups. For example, power control module 110 may power on currently needed tape drive(s) 108 and power down currently un-needed tape drive(s) 108.

Cache control module 112 coupled to processor 102 may be any system, device, or apparatus operable to receive a request (e.g., a status inquiry, a write command, a read command, or any other communication) from processor 102 intended for tape drive 108. In some situations, cache control module 112 may respond to the request on behalf of tape drive 108. For example, when tape drive 108 is in a powered down mode, cache control module 112 may respond to standard interface requests (e.g., small computer system interface (SCSI) commands) by processor 102 on behalf of tape drive 108. This response by cache control module 112 allows power tape drive 108 to remain powered down, which allows for reduced power consumption. Further, requests from processor 102 to idled tape drive 108 may still be processed while the tape drive is powered down, thus resulting in an uninterrupted process flow between processor 102 and tape drive 108.

In operation, if cache control module 102 receives a request from processor 102 that would require tape drive 108 to be powered on, cache control module 112 may provide instructions to power control module 110. In response, power control module 110 may turn on tape drive 108. Tape drive 108 may remain on to handle the request from processor 102. Upon handling the request and/or after a predetermined time period, cache control module 102 may provide instructions to power control module 110 to power down tape drive 108 if no further commands require tape drive 108 to be powered on. The predetermined time period may be set in any suitable manner in order to conserve power. For example, the predetermined time period may be a user defined time period or an automatic time period set by processor 102, cache control module 112, power control module 110, or any other similar devices.

Similarly, if cache control module 102 receives a request from processor 102 that does not require tape drive 108 to be on, cache control module 102 may provide instructions to power control module 110 to power down tape drive 108 to conserve power.

In some embodiments, power control module 110 and/or cache control module 112 may determine if any requests that would require access to tape drive 108 (e.g., reading or writing to tape drive 108) are outstanding or currently pending. If there are no pending or outstanding requests from processor 102, power control module 110 may power down tape drive 108, and in a network configuration with multiple tape drives 108, may power down one, some, or all of the tape drives 108. Subsequent inquires, e.g., a command descriptor block (CDB) from processor 102, may be addressed by cache control module 112, as described in more details below.

In the same or alternative embodiments, power control module 110 and/or cache control module 112 may determine if there are any upcoming requests (e.g., a scheduled request) to access tape drive 108. Power control module 110 may power on each required tape drive 108 as needed to satisfy such upcoming requests.

FIG. 2 illustrates a flow chart of an example method 200 for conserving power in systems utilizing storage devices, such as tape drive 108. In one embodiment, at step 202, cache control module 112 may receive a request (e.g., a status inquiry, a write command, a read command, etc.) from processor 102 for tape drive 108. The request may be a SCSI command or any other interface protocol for communicating between processor 102 and tape drive 108.

At step 204, cache control module 112 determines whether tape drive 108 is powered on. If tape drive 108 is powered on, at step 206, the request is forwarded to tape drive 108 for processing. In other words, if tape drive 108 is powered on, cache control 102 may forward the request received in step 202 such that tape drive 108 may respond directly to the request.

At step 208, cache control module 112 and/or power control module 110 may determine when to power down tape drive 108. In some embodiments, tape drive 108 may be powered down after processing the request at step 206. In other embodiments, tape drive 108 may remain powered on until after a timer (e.g., a user defined timer, an automatic timer, etc.) indication and/or no further requests from processor 102 to access tape drive 108 is in queue. Cache control 112 may provide instructions to power control module 110 to power down tape drive 108 to conserve power.

If it is determined at step 204 that tape drive 108 is not powered on, at step 210 cache control module 112 may determine if tape drive 108 should be powered on to process the incoming request. For example, the request received at step 202 may be a write command, a read command, or other request that may require tape drive 108 to be accessible (e.g., powered on) for processing the request. If it is determined that tape drive 108 should be powered on to process the incoming request, at step 212 cache control module 112 may send a command to power control module 110 to turn on tape drive 108. Once tape drive 108 is turned on, the request may be forwarded to tape drive 108 for processing.

If it is determined at step 210 that tape drive 108 does not need to be powered on to process the incoming request, cache control module 112 may respond on behalf of tape drive 108 at step 214. For example, the request may be a status inquiry or other similar interface requests that does not require tape drive 108 to be accessible. Cache control module 112 may "trick" processor 102 into thinking that tape drive 108 is powered on and responding, when tape drive 108 is actually powered down for power conservation.

Method 200 may be applied for a network configuration, where one or more tape drives 108 configured in an array or similar configuration may be used to store data. Cache control module 112 may intercept request(s) sent by one or more processors 102 associated with the one or more tape drives 108 and may determine if the tape drive(s) corresponding to the request(s) are powered on at step 204. If the tape drive(s) are powered on, the request(s) may be forwarded to the corresponding tape drive(s) 108 for direct response to the request(s) by the one or more processors 102.

If the tape drive(s) 108 are not powered on at step 204, cache control module 112 may determine if the request(s) require the tape drive(s) 108 be on to process the request (e.g., write commands, read commands, copy commands, lock commands, etc.) at step 210, and if so, cache control module 112 may send a command to power control module 110 to turn on the corresponding tape drive(s) 108 at step 212. The request may be forwarded by cached control module 112 to tape drive(s) 108 such that the tape drive(s) may respond to processor 102.

If it is determined that tape drives 108 do not need to be powered on to process the request at step 210, cache control module 112 may respond on behalf of tape drive(s) 108 at step 214. For example, the request may be a status inquiry, a verify command, or other similar interface requests that does not require tape drive 108 to be accessible. Cache control module 112 may "trick" processor 102 into thinking that tape drive(s) 108 are powered on and responding, when one, some, or all of tape drive(s) 108 in the network are actually powered down for power conservation.

In some embodiments, power control module 110 and/or cache control module 112 may determine that upcoming scheduled requests from processor 102 may not require tape drive 108, or in a network configuration, an array of tape drives 108, to be accessible. Power control module 110 may partially or fully power down tape drive 108, or in a network configuration, one, some, or all of tape drives 108. The tape drive(s) 108 may remain in powered down mode to conserve power, until a request is received at cache control module 112 (step 202 of FIG. 2). Upon receipt of the request, cache control module 112 may determine whether or not the request may be handled by cache control module 112 and if one or more tape drive(s) need to be powered on by power control module 110. In other words, tape drive(s) 108 may be in partial or full powered down mode until a request requiring access is received.

Similarly, tape drive(s) 108 may be in partial or full powered down mode until a scheduled request by processor 102 is received. One or more tape drive(s) 108 may be powered on to respond to the scheduled request and may subsequently be powered down when the request is fulfilled and/or when it is determined by power control module 110 and/or cache control module 112 that the powered on tape drive(s) 112 is no longer needed by processor 102.

The present disclosure provides an efficient system and method for conserving power consumption of back-up devices, such as tape drives. Other configurations, including other storage devices may benefit from the techniques and systems described herein.

Although the present disclosure has been described in detail, it should be understood that various changes, substitutions, and alterations can be made hereto without departing from the spirit and the scope of the invention as defined by the appended claims.

What is claimed is:

1. An information handling system, comprising:
   a processor;
   a tape drive coupled to the processor; and
   a cache control module configured to:
   receive a request from the processor for the tape drive;
   determine whether the tape drive is powered off;
   determine, based at least on the request, whether the tape drive needs to be powered on to process the request; and
   respond to the request on behalf of the tape drive if it is determined that (a) the tape drive is powered off and (b) the tape drive does not need to be powered on to process the request.

2. The information handling system of claim 1, wherein the cache control module is further configured to forward the request to the tape drive for processing if it is determined that the tape drive is powered on.

3. The information handling system of claim 1, wherein the cache control module is further configured to forward the request to the tape drive for processing if it is determined that the tape drive needs to be powered on to process the request.

4. The information handling system of claim 1, further comprising a power control module coupled to the processor, the power control module configured to control power to the tape drive.

5. The information handling system of claim 4, wherein the power control module is configured to power the tape drive in response to scheduled inquires from the processor.

6. The information handling system of claim 4, wherein the power control module is configured to:
- receive a command from the cache control module to control power to the tape drive; and
- control power to the tape drive in response to the command from the cache control module.

7. The information handling system of claim 1, wherein the cache control module is configured to:
- power down the tape drive after a predetermined time period if it is determined that tape drive is powered on.

8. An apparatus, comprising:
a cache control module configured to:
- receive a request from a processor and intended for a tape drive;
- determine whether the tape drive is powered off;
- determine, based at least on the request, whether the tape drive needs to be powered on to process the request; and
- respond to the request on behalf of the tape drive if it is determined that (a) the tape drive is powered off and (b) the tape drive does not need to be powered on to process the request.

9. The apparatus of claim 8, wherein the request is a small computer system interface (SCSI) command.

10. The apparatus of claim 8, wherein the cache control module is further configured to forward the request to the tape drive for processing if it is determined that the tape drive is powered on.

11. The apparatus of claim 8, wherein the cache control module is further configured to forward the request to the tape drive for processing if it is determined that the tape drive needs to be powered on to process the request.

12. The apparatus of claim 8, further comprising a power control module coupled to the processor, the power control module configured to control power to the tape drive.

13. The apparatus of claim 12, wherein the power control module is configured to power the tape drive in response to scheduled inquires from the processor.

14. The apparatus of claim 12, wherein the power control module is configured to:
- receive a command from the cache control module to control power to the tape drive; and
- control power to the tape drive in response to the command from the cache control module.

15. A method, comprising:
- receiving at a cache control module a request from a processor intended for a tape drive;
- determining whether the tape drive is powered off;
- determining, based at least on the request, whether the tape drive needs to be powered on to process the request; and
- responding to the request on behalf of the tape drive if it is determined that (a) the tape drive is powered off and (b) the tape drive does not need to be powered on to process the request.

16. The method of claim 15, further comprising forwarding the request to the tape drive for processing if it is determined that the tape drive is powered on.

17. The method of claim 15, further comprising forwarding the request to the tape drive for processing if it is determined that the tape drive needs to be powered on to process the request.

18. The method of claim 15, further comprising powering on the tape drive in response to scheduled requests from the processor.

19. The method of claim 15, further comprising automatically powering on the tape drive if it is determined that (a) the tape drive is powered off and (b) the tape drive needs to be powered on to process the request.

20. The method of claim 15, further comprising powering down the tape drive after a predetermined time period if it is determined that tape drive is powered on.

* * * * *